United States Patent
Mizushima et al.

(12) 
(10) Patent No.: US 7,608,657 B2
(45) Date of Patent: Oct. 27, 2009

(54) LIQUID SILICONE RUBBER COATING AGENT COMPOSITION AND AIR BAG USING THE COMPOSITION

(75) Inventors: Hidenori Mizushima, Annaka (JP); Masayuki Ikeno, Maebashi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 223 days.

(21) Appl. No.: 11/332,216

(22) Filed: Jan. 17, 2006

(65) Prior Publication Data

US 2006/0159935 A1 Jul. 20, 2006

(30) Foreign Application Priority Data

Jan. 18, 2005 (JP) ............................. 2005-010082

(51) Int. Cl.
*C08L 83/07* (2006.01)
(52) U.S. Cl. ...................... 524/493; 524/588; 442/164; 442/168
(58) Field of Classification Search ................ 524/588, 524/492, 493; 442/164, 168
See application file for complete search history.

(56) References Cited

U.S. PATENT DOCUMENTS

| | | | | |
|---|---|---|---|---|
| 5,312,860 | A | * | 5/1994 | Mize et al. ................. 524/493 |
| 5,529,837 | A | * | 6/1996 | Fujiki et al. ................. 442/136 |
| 6,387,520 | B1 | | 5/2002 | Fujiki et al. |
| 6,420,037 | B1 | | 7/2002 | Tsuji et al. |
| 2005/0267257 | A1 | | 12/2005 | Mizushima et al. |

FOREIGN PATENT DOCUMENTS

| | | |
|---|---|---|
| EP | 0 669 419 A1 | 8/1995 |
| EP | 0 712 956 A1 | 5/1996 |
| EP | 1 013 817 A2 | 6/2000 |
| EP | 1 046 671 A2 | 10/2000 |
| EP | 1 078 823 A2 | 2/2001 |
| EP | 1 108 764 A2 | 6/2001 |
| WO | WO 93/08236 | 4/1993 |

OTHER PUBLICATIONS

U.S. Appl. No. 11/742,910, filed May 1, 2007, Ikeno et al.
U.S. Appl. No. 11/346,447, filed Feb. 3, 2006, Ikeno et al.
U.S. Appl. No. 11/758,436, Jun. 5, 2007, Mizushima et al.
U.S. Appl. No. 12/044,446, filed Mar. 7, 2008, Ikeno et al.
U.S. Appl. No. 12/181,682, filed Jul. 29, 2008, Ikeno et al.

* cited by examiner

*Primary Examiner*—Margaret G Moore
(74) *Attorney, Agent, or Firm*—Oblon, Spivak, McClelland, Maier & Neustadt, L.L.P.

(57) ABSTRACT

Provided is a liquid silicone rubber coating agent composition, including:
(A) an organopolysiloxane containing at least two silicon atom-bonded alkenyl groups within each molecule,
(B) an organohydrogenpolysiloxane containing at least two silicon atom-bonded hydrogen atoms within each molecule,
(C) an addition reaction catalyst,
(D) a gelled silica with a BET specific surface area within a range from 260 to 500 $m^2/g$ and an average particle size within a range from 0.5 to 20 μm, and
(E) an adhesion improver. Also provided is an air bag with a rubber coating layer including a cured product of the above composition. The liquid silicone rubber coating agent composition yields a cured product with excellent properties of adhesion to fiber, rubber strength, and blocking resistance.

11 Claims, No Drawings

LIQUID SILICONE RUBBER COATING AGENT COMPOSITION AND AIR BAG USING THE COMPOSITION

BACKGROUND OF THE INVENTION

1. Field of the Invention

The present invention relates to a liquid silicone rubber coating agent composition that yields a cured product with excellent properties of adhesion to fiber, rubber strength, and blocking resistance and the like, as well as an air bag with a rubber coating layer comprising a cured product of such a composition.

2. Description of the Prior Art

Conventionally, silicone rubber-coated fabrics that have been produced with the aim of forming a rubber coating on the surface of fibers have retained the characteristic stickiness of silicone rubber, meaning the ease of operations such as cutting and stitching performed following coating has been very poor. In order to overcome these problems, a powder such as talc with superior properties of adhesion and slipperiness is typically dusted over the rubber surface. However, this method is not only costly, but the resulting powder dust can have a deleterious impact on human health. Furthermore, because the powder is simply adhered to the surface of the rubber-coated fabric, the powder is readily removed, meaning it is unable to provide a stable effect.

In order to overcome these problems, the compositions described below have been proposed. For example, a coating composition for a rubber-coated fabric prepared by adding a powder of an inorganic compound or organic compound with an average particle diameter of 0.5 to 20 μm selected from the group consisting of aluminum hydroxide, mica, dimethylsilsesquioxane, carbon, polyamide, and polyfluoroethylene to a rubber coating composition (patent reference 1); a coating composition for a low-tackiness rubber-coated fabric prepared by adding a drying oil compound selected from the group consisting of natural drying oils, modified natural drying oils, liquid diene compounds, and unsaturated fatty acid esters to a rubber coating composition (patent reference 2); a coating composition for a rubber-coated fabric with minimal tackiness of the surface of the rubber coating film, prepared by adding a hollow powder such as an aluminosilicate hollow powder, glass balloons, silica balloons, shirasu balloons, carbon balloons, alumina balloons, plastic balloons or a silicone resin hollow powder, or an alumina powder, glass powder or plastic powder, with an average particle size within a range from 10 to 300 μm, to a rubber coating composition (patent reference 3); and a coating composition for a rubber-coated fabric with reduced tackiness, prepared by adding a wet silica with an average BET specific surface area within a range from 150 to 250 m$^2$/g and an average particle size of no more than 20 μm to a rubber coating composition (patent reference 4) have been proposed.

However, although all of these compositions provide improved workability properties following curing, the cured products are not able to provide satisfactory blocking resistance, while still retaining favorable levels of properties such as adhesion to fibers and rubber strength.

[Patent Reference 1] EP 0 712 956 A1
[Patent Reference 2] EP 1 013 817 A2
[Patent Reference 3] U.S. Pat. No. 6,420,037
[Patent Reference 4] U.S. Pat. No. 6,387,520

SUMMARY OF THE INVENTION

The present invention takes the above circumstances into consideration, with an object of providing a liquid silicone rubber coating agent composition that yields a cured product with excellent properties of adhesion to fiber, rubber strength, and blocking resistance, as well as an air bag with a rubber coating layer comprising the cured product.

As a result of intensive investigation aimed at achieving the above object, the inventors of the present invention completed the present invention.

In other words, a first aspect of the present invention provides a liquid silicone rubber coating agent composition, comprising:

(A) 100 parts by mass of an organopolysiloxane containing at least two alkenyl groups bonded to silicon atoms within each molecule, (B) an organohydrogenpolysiloxane containing at least two hydrogen atoms bonded to silicon atoms within each molecule, in sufficient quantity to provide from 1 to 7 mols of hydrogen atoms bonded to silicon atoms within the composition for each 1 mol of alkenyl groups bonded to silicon atoms within the composition, (C) an effective quantity of an addition reaction catalyst, (D) 1 to 50 parts by mass of a gelled silica with a BET specific surface area within a range from 260 to 500 m$^2$/g and an average particle size within a range from 0.5 to 20 μm, and (E) 0.1 to 10 parts by mass of an adhesion improver.

Furthermore, a second aspect of the present invention provides an air bag with a rubber coating layer comprising a cured product of the above composition.

A cured product produced by curing a liquid silicone rubber coating agent composition of the present invention not only exhibits excellent levels of adhesion to fibers, rubber strength, and blocking resistance, but also has a significantly reduced level of the stickiness characteristic of rubber, meaning the cured product has a favorable feel, and exhibits excellent workability during stitching. Furthermore, the composition also exhibits excellent ease of application, and can be used without requiring solvent dilution, meaning it is environmentally friendly. An air bag with a rubber coating layer comprising this cured product is resistant to peeling of the rubber coating layer, meaning leakage of the inflator gas is unlikely, thereby enabling excellent maintenance of the inflated state.

DETAILED DESCRIPTION OF THE PREFERRED EMBODIMENTS

As follows is a more detailed description of the present invention.

<Liquid Silicone Rubber Coating Agent Composition>

A liquid silicone rubber coating agent composition of the present invention comprises the components (A) through (E) described below.

-(A) Organopolysiloxane-

The organopolysiloxane of the component (A) is the principal component of a composition of the present invention, and contains, on average, at least two, and preferably from 2 to 20, alkenyl groups bonded to silicon atoms (hereafter referred to as "silicon atom-bonded alkenyl groups") within each molecule.

These silicon atom-bonded alkenyl groups typically contain from 2 to 8, and preferably from 2 to 4, carbon atoms. Specific examples include vinyl groups, allyl groups, butenyl groups, pentenyl groups, hexenyl groups and heptenyl groups, although vinyl groups are preferred.

The bonding positions of these silicon atom-bonded alkenyl groups within the organopolysiloxane may be the molecular chain terminals, non-terminal positions within the molecular chain (namely, side chains of the molecular chain), or both of these positions.

In the organopolysiloxane molecule of this component, there are no particular restrictions on organic groups bonded to silicon atoms (hereafter referred to as "silicon atom-bonded organic groups") other than the silicon atom-bonded alkenyl groups, provided these organic groups contain no aliphatic unsaturated bonds. Examples of these organic groups include unsubstituted or substituted monovalent hydrocarbon groups, typically of 1 to 12, and preferably 1 to 10, carbon atoms. Specific examples of these unsubstituted or substituted monovalent hydrocarbon groups include alkyl groups such as methyl groups, ethyl groups, propyl groups, butyl groups, pentyl groups, hexyl groups, and heptyl groups; cycloalkyl groups such as cyclohexyl groups; aryl groups such as phenyl groups, tolyl groups, xylyl groups, and naphthyl groups; aralkyl groups such as benzyl groups and phenethyl groups; and groups in which either a portion of, or all of, the hydrogen atoms within these group have been substituted with a halogen atom such as a fluorine, chlorine, or bromine atom, including halogenated alkyl groups such as chloromethyl groups, 3-chloropropyl groups, and 3,3,3-trifluoropropyl groups, although of these, alkyl groups and aryl groups are preferred, and methyl groups and phenyl groups are particularly desirable.

In this component, the quantity of silicon atom-bonded alkenyl groups, relative to the total number of silicon atom-bonded organic groups within the component, is preferably within a range from 0.001 to 10 mol %, and even more preferably from 0.01 to 5 mol %.

There are no particular restrictions on the molecular structure of the organopolysiloxane of this component, and suitable structures include straight-chain, partially branched straight-chain, cyclic, and branched-chain structures, although a straight-chain diorganopolysiloxane in which the principal chain comprises basically repeating diorganosiloxane units and the molecular chain terminals are blocked with triorganosiloxy groups is preferred.

The viscosity at 25° C. for this component is preferably within a range from 100 to 500,000 mPa·s, and even more preferably from 300 to 100,000 mPa·s, as such values result in superior physical properties such as adhesion of the cured product to fibers, rubber strength and blocking resistance, as well as superior workability.

Examples of the organopolysiloxane of this component include materials represented by an average composition formula (1) shown below:

$$R^1{}_a R^2{}_b SiO_{(4-a-b)/2} \quad (1)$$

(wherein, $R^1$ represents an unsubstituted or substituted monovalent hydrocarbon group that contains no aliphatic unsaturated bonds, $R^2$ represents an alkenyl group, a represents a number from 1.7 to 2.1, b represents a number from 0.00001 to 0.1, and a+b represents a number within a range from 1.8 to 2.2).

In the average composition formula (1) shown above, the unsubstituted or substituted monovalent hydrocarbon group that contains no aliphatic unsaturated bonds represented by $R^1$ typically contains from 1 to 12, and preferably from 1 to 10, carbon atoms. Specific examples include those groups listed above as examples of silicon atom-bonded organic groups other than the silicon atom-bonded alkenyl groups.

The alkenyl group represented by $R^2$ typically contains from 2 to 8, and preferably from 2 to 4, carbon atoms. Specific examples include those groups listed above as examples of the silicon atom-bonded alkenyl groups.

a is preferably a number from 1.9 to 2.0, b is preferably a number from 0.0001 to 0.05, and a+b preferably satisfies a range from 1.95 to 2.05.

Specific examples of the organopolysiloxane of this component include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane and methylphenylsiloxane with both molecular chain terminals blocked with dimethylvinylsiloxy groups, dimethylpolysiloxane with both molecular chain terminals blocked with divinylmethylsiloxy groups, copolymers of dimethylsiloxane and methylvinylsiloxane with both molecular chain terminals blocked with divinylmethylsiloxy groups, dimethylpolysiloxane with both molecular chain terminals blocked with trivinylsiloxy groups, copolymers of dimethylsiloxane and methylvinylsiloxane with both molecular chain terminals blocked with trivinylsiloxy groups, organosiloxane copolymers comprising siloxane units represented by the formula $R^1{}_3SiO_{1/2}$ (wherein, $R^1$ is as defined above, this also applies below), siloxane units represented by the formula $R^1{}_2R^2SiO_{1/2}$ (wherein, $R^2$ is as defined above, this also applies below), siloxane units represented by the formula $R^1{}_2SiO$, and a small quantity of siloxane units represented by the formula $SiO_2$, organosiloxane copolymers comprising siloxane units represented by the formula $R^1{}_3SiO_{1/2}$, siloxane units represented by the formula $R^1{}_2R^2SiO_{1/2}$, and siloxane units represented by the formula $SiO_2$, organosiloxane copolymers comprising siloxane units represented by the formula $R_2R\,SiO_{1/2}$, siloxane units represented by the formula $R^1{}_2SiO$, and a small quantity of siloxane units represented by the formula $SiO_2$, and organosiloxane copolymers comprising siloxane units represented by the formula $R^1R^2SiO$, and a small quantity of siloxane units represented by the formula $R^1SiO_{3/2}$ or a small quantity of siloxane units represented by the formula $R^2SiO_{3/2}$, as well as mixtures of two or more of these organopolysiloxanes.

The organopolysiloxane of the component (A) may use either a single material, or a combination of two or more different materials.

-(B) Organohydrogenpolysiloxane-

The organohydrogenpolysiloxane of the component (B) functions as a cross-linking agent in the addition curing reaction with the component (A), and also imparts adhesiveness to the cured product. This organohydrogenpolysiloxane contains an average of at least two, and preferably at least three, and preferably no more than 500, and even more preferably no more than 200, and most preferably no more than 100, hydrogen atoms bonded to silicon atoms (hereafter also referred to as silicon atom-bonded hydrogen atoms", that is, SiH groups) within each molecule, and preferably contains no aliphatic unsaturated bonds within the molecule.

The bonding positions of the silicon atom-bonded hydrogen atoms within the organohydrogenpolysiloxane of this component may be the molecular chain terminals, non-terminal positions within the molecular chain, or both of these positions.

In this organohydrogenpolysiloxane molecule, there are no particular restrictions on silicon atom-bonded organic groups other than the above silicon atom-bonded hydrogen atoms, although these organic groups preferably contain no aliphatic unsaturated bonds, and suitable examples include unsubstituted or substituted monovalent hydrocarbon groups, typically of 1 to 10, and preferably 1 to 6, carbon atoms. Specific examples of these groups include those groups listed above in the description of the component (A) as examples of silicon atom-bonded organic groups other than the silicon atom-bonded alkenyl groups, as well as alkenyl groups such as vinyl groups and allyl groups.

In this component, the quantity of the silicon atom-bonded hydrogen atoms, relative to the combined total of all the silicon atom-bonded organic groups and silicon atom-bonded hydrogen atoms within the component, is preferably within a range from 0.1 to 60 mol %, and even more preferably from 1 to 50 mol %.

There are no particular restrictions on the molecular structure of the organohydrogenpolysiloxane of this component, and structures produced using conventional processes can be used, including straight-chain, cyclic, branched-chain, or three dimensional network (resin) structures, although straight-chain or cyclic structures are preferred.

The viscosity at 25° C. for this component is preferably within a range that means the component is a liquid at room temperature (25° C.), specifically within a range from 0.1 to 5,000 mPa·s, and even more preferably from 0.5 to 1,000 mPa·s, and most preferably from 5 to 500 mPa·s, as such values result in superior physical properties such as adhesion of the cured product to fibers, rubber strength and blocking resistance, as well as superior workability. In those cases where the viscosity satisfies the above range, the number of silicon atoms within each molecule of the organohydrogenpolysiloxane (or the polymerization degree) is typically within a range from 2 to 1,000, and preferably from 3 to 300, and most preferably from 4 to 150.

Examples of the organohydrogenpolysiloxane of this component include the materials represented by an average composition formula (2) shown below.

$$R^3{}_c H_d SiO_{(4-c-d)/2} \quad (2)$$

(wherein, $R^3$ represents an unsubstituted or substituted monovalent hydrocarbon group, c represents a number from 0.7 to 2.1, d represents a number from 0.001 to 1.0, and c+d represents a number within a range from 0.8 to 3.0).

In the above average composition formula (2), the unsubstituted or substituted monovalent hydrocarbon group represented by $R^3$ typically contains from 1 to 10, and preferably from 1 to 6, carbon atoms. These monovalent hydrocarbon groups preferably contain no aliphatic unsaturated bonds such as alkenyl groups. Specific examples of these unsubstituted or substituted monovalent groups include those groups listed above in the description of the component (A) as examples of silicon atom-bonded organic groups other than the silicon atom-bonded alkenyl groups, as well as alkenyl groups such as vinyl groups and allyl groups.

c is preferably a number from 1.0 to 2.0, d is preferably a number from 0.01 to 1.0, and c+d preferably satisfies a range from 1.5 to 2.5.

Specific examples of the organohydrogenpolysiloxane of this component include 1,1,3,3-tetramethyldisiloxane, 1,3,5,7-tetramethylcyclotetrasiloxane, methylhydrogencyclopolysiloxane, cyclic copolymers of dimethylsiloxane and methylhydrogensiloxane, tris(dimethylhydrogensiloxy)methylsilane, tris(dimethylhydrogensiloxy)phenylsilane, methylhydrogenpolysiloxane with both molecular chain terminals blocked with trimethylsiloxy groups, copolymers of dimethylsiloxane and methylhydrogensiloxane with both molecular chain terminals blocked with trimethylsiloxy groups, copolymers of dimethylsiloxane, methylhydrogensiloxane, and methylphenylsiloxane with both molecular chain terminals blocked with trimethylsiloxy groups, dimethylpolysiloxane with both molecular chain terminals blocked with dimethylhydrogensiloxy groups, copolymers of dimethylsiloxane and methylhydrogensiloxane with both molecular chain terminals blocked with dimethylhydrogensiloxy groups, copolymers of dimethylsiloxane and methylphenylsiloxane with both molecular chain terminals blocked with dimethylhydrogensiloxy groups, methylphenylpolysiloxane with both molecular chain terminals blocked with dimethylhydrogensiloxy groups, copolymers comprising siloxane units represented by the formula $(CH_3)_2HSiO_{1/2}$, siloxane units represented by the formula $(CH_3)_3SiO_{1/2}$, and siloxane units represented by the formula $SiO_{1/2}$, copolymers comprising siloxane units represented by the formula $(CH_3)_2HSiO_{1/2}$ and siloxane units represented by the formula $SiO_{4/2}$, as well as mixtures of two or more of these organopolysiloxanes.

Of these, organohydrogenpolysiloxanes comprising a combination of: (1) an organohydrogenpolysiloxane, which contains no aliphatic unsaturated bonds, and in which both molecular chain terminals are blocked with siloxane units represented by a formula $R^3{}_3SiO_{1/2}$ (wherein, each $R^3$ is, independently, as defined above, this definition also applies below), and the principal chain comprises repeating siloxane units represented by a formula $R^3HSiO_{1/2}$; and (2) a copolymer of a diorganosiloxane and an organohydrogensiloxane, which contains no aliphatic unsaturated bonds, and in which each molecular chain terminal is blocked, independently, with a siloxane unit represented by a formula $R^3{}_3SiO_{1/2}$, or a siloxane unit represented by a formula $R^3{}_2HSiO_{1/2}$, and the principal chain comprises a random arrangement of repeating siloxane units represented by a formula $R^3{}_2SiO_{2/2}$ and siloxane units represented by a formula $R^3HSiO_{2/2}$. Specifically, materials comprising a combination of (1) a methylhydrogenpolysiloxane with both molecular chain terminals blocked with trimethylsiloxy groups, and (2) a copolymer of dimethylsiloxane and methylhydrogensiloxane with both molecular chain terminals blocked with either trimethylsiloxy groups or dimethylhydrogensiloxy groups are preferred.

The blend quantity of the component (B) is as described below. A composition of the present invention may also include components containing silicon atom-bonded alkenyl groups other than component (A), and/or components containing silicon atom-bonded hydrogen atoms other than the component (B). Accordingly, the blend quantity of the component (B) must be sufficient to provide from 1 to 7 mols, and preferably from 2 to 6 mols, of silicon atom-bonded hydrogen atoms within the composition for each 1 mol of silicon atom-bonded alkenyl groups within the composition, although in particular, the blend quantity should be sufficient to provide from 1 to 7 mols, and preferably from 2 to 6 mols, of silicon atom-bonded hydrogen atoms within the component (B) for each 1 mol of silicon atom-bonded alkenyl groups within the component (A). The reason for this requirement is that if this blend quantity provides less than 1 mol of the silicon atom-bonded hydrogen atoms per 1 mol of the silicon atom-bonded alkenyl groups, then the strength of the coating film is inadequate, whereas if the quantity exceeds 7 mols, the heat resistance and strength of the coating film deteriorate markedly. The proportion of the total number of silicon atom-bonded alkenyl groups within the composition accounted for by the silicon atom-bonded alkenyl groups within the component (A) is preferably within a range from 90 to 100 mol %, and even more preferably from 95 to 100 mol %, and most preferably from 99 to 100 mol %. Furthermore, the proportion of the total number of silicon atom-bonded hydrogen atoms within the composition accounted for by the silicon atom-bonded hydrogen atoms within the component (B) is typically within a range from 90 to 100 mol %, and preferably from 95 to 100 mol %, and most preferably from 99 to 100 mol %.

The organohydrogenpolysiloxane of the component (B) may use either a single material, or a combination of two or more different materials.

-(C) Addition Reaction Catalyst-

The addition reaction catalyst of the component (C) is used to promote and accelerate the hydrosilylation reaction between the silicon atom-bonded alkenyl groups within the component (A) and the silicon atom-bonded hydrogen atoms within the component (B). There are no particular restrictions on this addition reaction catalyst, and suitable examples include platinum-group metals such as platinum, palladium, and rhodium, chloroplatinic acid, alcohol modified chloroplatinic acid, coordination compounds of chloroplatinic acid with olefins, vinylsiloxane, or acetylene compounds, and platinum-group metal compounds such as tetrakis(triphenylphosphine)palladium and chlorotris(triphenylphosphine)rhodium, although of these, platinum compounds are preferred.

The blend quantity of the component (C) need only be an effective catalytic quantity, and a typical quantity, calculated as the mass of the platinum-group metal relative to the combined mass of the component (A) and the component (B), is within a range from 0.1 to 1,000 ppm, with quantities from 1 to 500 ppm being preferred, and quantities from 10 to 100 ppm being particularly desirable. By using an appropriate blend quantity, the addition reaction can be accelerated effectively. The addition reaction catalyst of the component (C) may use either a single material, or a combination of two or more different materials.

-(D) Gelled Silica-

The gelled silica of the component (D) is a component for reducing the stickiness characteristic of silicone rubbers and improving the feel of the rubber, thereby enabling preparation of a rubber-coated fabric that exhibits excellent workability during stitching and excellent block resistance and the like. This gelled silica must have a BET specific surface area within a range from 260 to 500 $m^2/g$, and an average particle size of 0.5 to 20 μm. If the BET specific surface area is less than 260 $m^2/g$, then the silicone rubber may remain sticky, making it impossible to improve the feel of the rubber, whereas if the value exceeds 500 $m^2/g$, the silicone rubber exhibits inferior blocking resistance. Furthermore, if the average particle size is less than 0.5 μm, then the silicone rubber exhibits inferior blocking resistance, whereas if the value exceeds 20 μm, improving the feel of the silicone rubber may become impossible. Within the above range, the BET specific surface area is preferably from 300 to 500 $m^2/g$, and most preferably from 400 to 500 $m^2/g$. Furthermore, the average particle size is typically within a range from 1 to 20 μm, and preferably from 5 to 18 μm, and most preferably from 10 to 16 μm. The average particle size of the gelled silica refers to the average value $D_{50}$ of the cumulative weight (or the median diameter) in a particle size distribution measurement conducted using a laser diffraction method, for a silica generated by a gel method.

Provided the gelled silica of this component satisfies the above required ranges for the BET specific surface area and the average particle size, known silica materials used as reinforcing fillers for conventional silicone rubbers can be used, and suitable examples include powdered silica materials such as precipitated silica. These powdered silica materials may be used as is, but are preferably used in a form in which the surface has undergone hydrophobic treatment with an organosilicon compound. There are no particular restrictions on the method used for producing the gelled silica.

Examples of the organosilicon compounds used in the hydrophobic treatment of the gelled silica surface include silazanes such as hexamethyldisilazane; alkyltrialkoxysilanes such as methyltrimethoxysilane, ethyltrimethoxysilane, propyltrimethoxysilane, and butyltrimethoxysilane; dialkyldialkoxysilanes such as dimethyldimethoxysilane and diethyldimethoxysilane; trialkylmonoalkoxysilanes such as trimethylmethoxysilane and triethylmethoxysilane; silane coupling agents such as vinyltriethoxysilane, vinyltrimethoxysilane, vinyltris(methoxyethoxy)silane, trimethylchlorosilane, dimethyldichlorosilane, divinyldimethoxysilane, and chloropropyltrimethoxysilane; as well as polymethylsiloxanes and organohydrogenpolysiloxanes. These organosilicon compounds may use either a single compound, or a combination of two or more different compounds.

In those cases where two or more organosilicon compounds are used in combination, the hydrophobic treatment of the gelled silica surface may be conducted using a mixture of the two compounds, or the two compounds may be separated, and sequential surface hydrophobic treatments then conducted using a portion of each compound.

The blend quantity of the component (D) must fall within a range from 1 to 50 parts by mass per 100 parts by weight of the component (A), and is preferably within a range from 1 to 10 parts by mass, as such values result in a more favorable flowability for the composition, and superior levels of workability and blocking resistance for the cured product. If this blend quantity exceeds 50 parts by mass, then the flowability of the composition may deteriorate, and the workability of the cured product may worsen, whereas if the blend quantity is less than 1 part by mass, no improvement in the blocking resistance of the silicone rubber may be noticeable.

The gelled silica of the component (D) may use either a single material, or a combination of two or more different materials.

-(E) Adhesion Improver>

The adhesion improver (E) used in the present invention is a component for improving the adhesion of the cured product (the rubber coating layer) to the synthetic fibers of woven base materials, or the non-woven base materials or sheets or films of thermoplastic resins used in air bags. There are no particular restrictions on this adhesion improver, provided it is capable of improving the self-adhesiveness of the cured product. Specific examples of suitable materials include organosilicon compounds different from the component (A) and the component (B), non-silicon-based organic compounds, epoxy ring-opening catalysts, and organotitanium compounds. Of these, compounds that contain at least one functional group within each molecule are preferred, and compounds that contain two or more functional groups are even more desirable.

Examples of suitable organosilicon compounds include organosilanes, straight-chain or cyclic siloxane oligomers comprising from 3 to 100, and preferably from 3 to 50, and most preferably from 5 to 20, silicon atoms, (alkoxy)silyl modified products of triallyl isocyanurate, and siloxane derivatives thereof, all of which contain at least one, and preferably two or more, functional groups bonded to silicon atoms and selected from the group consisting of alkenyl groups such as a vinyl group or allyl group; epoxy groups that are bonded to a silicon atom via carbon atom(s) within, for example, an alkylene group, such as a γ-glycidoxypropyl group or β-(3,4-epoxycyclohexyl)ethyl group; acryloxy groups and methacryloxy groups that are bonded to a silicon atom via carbon atom(s) within, for example, an alkylene group, such as a γ-acryloxypropyl group or γ-methacryloxypropyl group; alkoxyl groups such as a methoxy group, ethoxy group, propoxy group or butoxy group; alkoxysilyl groups such as a trimethoxsilyl group, triethoxysilyl group or methyldimethoxysilyl group that are bonded to a silicon atom via carbon atom(s) within, for example, an alkylene group and may also contain 1 or 2 ester structures, urethane structures, or ether structures; isocyanate groups; and (silicon atom-bonded) hydrogen atoms, and of these, compounds containing two or more functional groups within each molecule are preferred. However, siloxane oligomers in which the molecule contains only silicon atom-bonded alkenyl groups and/or silicon atom-bonded hydrogen atoms from the above list of functional groups, and moreover contains two or more of at least one of these two types of groups (namely, compounds that correspond with the component (A) or component (B)) are excluded.

Specific examples of this type of organosilicon compound include the compounds shown below.

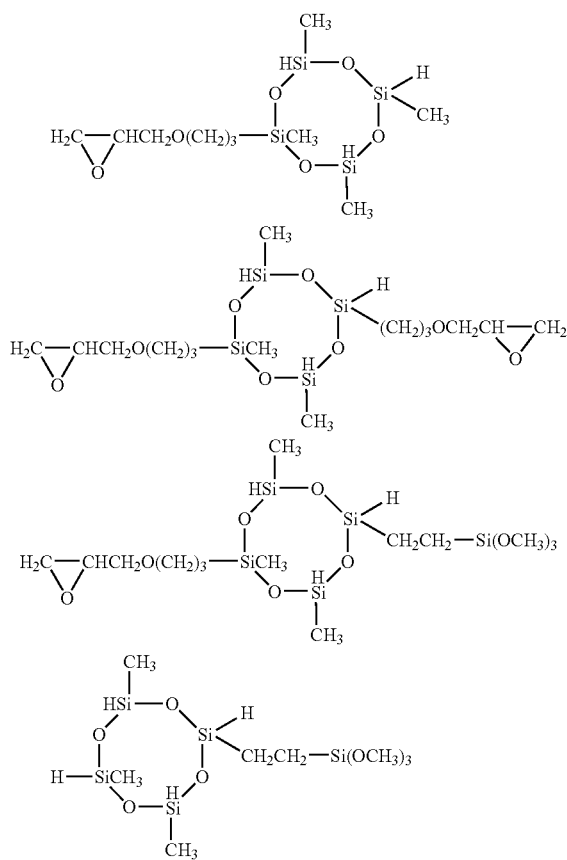

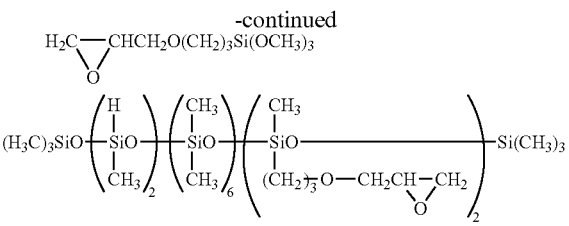

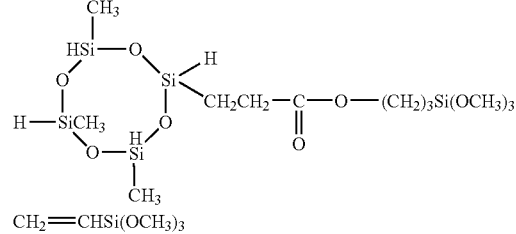

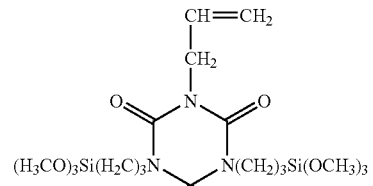

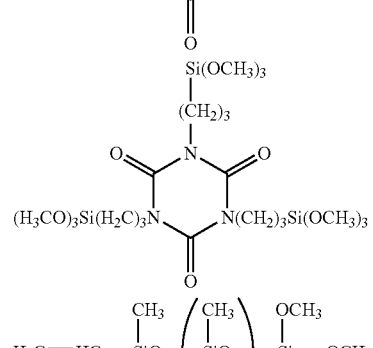

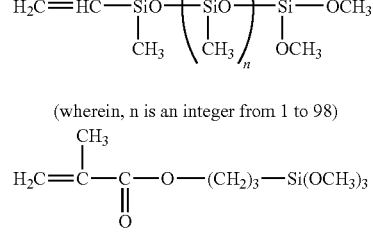

(wherein, n is an integer from 1 to 98)

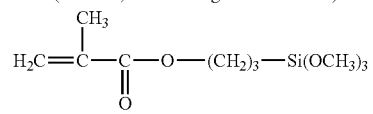

Examples of suitable non-silicon-based compounds include organic acid allyl esters containing one alkenyl group and at least one ester group within each molecule. Suitable organic acids include unsaturated carboxylic acids such as acrylic acid, methacrylic acid, and vinylacetic acid; aromatic carboxylic acids such as benzoic acid, phthalic acid, and pyromellitic acid; and saturated fatty acids such as acetic acid, propionic acid, butyric acid, valeric acid, and lauric acid. Specific examples of organic acid allyl esters comprising these organic acids include the allyl esters of unsaturated carboxylic acids such as acrylic acid, methacrylic acid, and vinylacetic acid; the allyl esters of aromatic carboxylic acids such as allyl benzoate, diallyl phthalate, and tetraallyl pyromellitate; and allyl esters of saturated fatty acids, such as allyl acetate, allyl propionate, allyl butyrate, allyl valerate, and allyl laurate.

The epoxy ring-opening catalysts must contain no silicon atoms within the molecule, and suitable examples include organometal chelates, as well as amine-based, amide-based, imidazole-based, and acid anhydride-based epoxy ring-opening catalysts.

The organotitanium compounds must contain no silicon atoms within the molecule, and suitable examples include tetrabutoxytitanium, tetrakis(2-ethylhexyloxy)titanium, tetrastearyloxytitanium, titanium stearate, tetraoctyloxytitanium, titanium isopropoxyoctylene glycolate, triethanolamine titanate, titanium acetylacetonate, titanium ethylacetonate, titanium lactonate, and oligomers and polymers generated as condensation reaction products of the above compounds.

In those cases where the adhesion improver of this component is a compound that contains an epoxy group within the molecule as the aforementioned functional group, the epoxy equivalence of the compound is preferably within a range from 100 to 5,000 g/mol, and even more preferably from 150 to 3,000 g/mol. If the epoxy equivalence falls within this range, then the viscosity of the composition is favorable, and the cured product exhibits superior adhesion.

Of the possible compounds listed above, the adhesion improver of this component is preferably a non-silicon-based organic compound with an epoxy equivalence of 100 to 5,000 g/mol, an organosilicon compound with an epoxy equivalence of 100 to 5,000 g/mol, an epoxy ring-opening catalyst with an epoxy equivalence of 100 to 5,000 g/mol, an organosilicon compound containing at least one silicon atom-bonded alkenyl group and/or silicon atom-bonded hydrogen atom, and at least one silicon atom-bonded alkoxy group within each molecule, an organotitanium compound containing at least 12 carbon atoms, an organosilicon compounds containing at least one nitrogen atom within each molecule, or a combination of the above.

The blend quantity of the component (E) must fall within a range from 0.1 to 10 parts by mass per 100 parts by mass of the component (A), and is preferably within a range from 0.5 to 5 parts by mass. If this blend quantity is less than 0.1 parts by mass, then the cured product may not exhibit adequate adhesion, whereas if the quantity exceeds 10 parts by mass, then the increased costs make the composition uneconomic.

The adhesion improver of the component (E) may use either a single material, or a combination of two or more different materials.

-Optional Components-

In addition to the components (A) through (E) described above, other optional components such as those described below can also be added as required. These optional components can be used either alone, or in combinations of two or more different materials.

-Reaction Retarders-

A reaction retarder may be any compound that exhibits a regulating effect on the curing reaction rate promoted by the addition reaction catalyst of the aforementioned component (C), and conventional reaction retarders can be used. Specific examples of suitable retarders include phosphorus-containing compounds such as triphenylphosphine; nitrogen atom-containing compounds such as tributylamine, tetramethylethylenediamine, and benzotriazole; sulfur atom-containing compounds; acetylene-based compounds such as acetylene alcohols; compounds that contain from 50 to 100 mol % of silicon atom-bonded alkenyl groups relative to the number of silicon atoms within the molecule, such as cyclic methylvinylsiloxanes; hydroperoxy compounds; and maleic acid derivatives.

The effect of the reaction retarder in regulating the curing reaction rate varies depending on its chemical structure, and consequently the blend quantity of the reaction retarder is preferably adjusted to the most appropriate quantity for the particular reaction retarder being used. By using the most appropriate quantity of the reaction retarder, a composition with superior levels of curability can be obtained.

-Inorganic Fillers

Examples of suitable inorganic fillers include fillers such as crystalline silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; the above types of inorganic fillers that have undergone hydrophobic surface treatment with an organosilicon compound such as an organoalkoxysilane compound, organochlorosilane compound, organosilazane compound, or low molecular weight siloxane compound; silicone rubber powder, and silicone resin powder. However, the above inorganic fillers must be different from the above component (D).

-Other Components

Examples of other components include, for example, organopolysiloxanes containing one silicon atom-bonded hydrogen atom or one silicon atom-bonded alkenyl group within each molecule, but containing no other functional groups, such as straight-chain diorganopolysiloxanes with a silicon atom-bonded alkenyl group or a silicon atom-bonded hydrogen atom at one terminal of the molecular chain, and with the other terminal blocked with a trialkylsiloxy group, and straight-chain diorganopolysiloxanes in which both molecular chain terminals are blocked with trialkylsiloxy groups; unreactive organopolysiloxanes containing no silicon atom-bonded hydrogen atoms or silicon atom-bonded alkenyl groups; as well as creep hardening prevention agents, plasticizers, thixotropic imparting agents, pigments, dyes, mold-proofing agents, and organopolysiloxane resins with three dimensional network structures, which are used for improving the rubber strength of the cured product, and comprise, for example, siloxane units represented by the formula $R^3{}_3SiO_{1/2}$ (wherein, $R^3$ is as defined above) and siloxane units represented by the formula $SiO_{4/2}$, and which may, or may not, contain alkenyl groups.

In addition, although a composition of the present invention can be used favorably without adding an organic solvent, the composition may also be diluted to a desired concentration with an organic solvent such as toluene or xylene prior to application of the composition to a substrate, depending on the type of apparatus being used and other coating conditions.

<Coating Agents>

A composition of the present invention can be prepared by mixing together the aforementioned components (A) through (E), together with any optional components that may be required. A composition prepared in this manner is useful as a coating agent for fibers, and as a coating agent for air bags, and is particularly useful as a coating agent for woven air bags.

In those cases where the composition is used as a coating agent for an air bag, the composition is preferably a low viscosity liquid at room temperature (25° C.). The viscosity of the composition is preferably within a range from 1,000 to 300,000 mPa·s, and even more preferably from 20,000 to 90,000 mPa·s, and most preferably from 30,000 to 80,000 mPa·s. If this viscosity falls within the above range, then not only can the inflated state of the air bag be maintained for a satisfactory period of time, but a favorable coating layer surface is obtained following completion of the composition coating process. Furthermore, curing of the above composition can be conducted using conventional curing methods and conditions, and is typically conducted by heating at 120 to 180° C. for a period of 0.1 to 10 minutes.

<Air Bags>

There are no particular restrictions on the air bags, and preferably woven air bags, containing a rubber coating layer comprising a cured product of a composition of the present invention, and conventional air bags can be used. Specific examples of suitable air bags include those formed from synthetic fibers such as Nylon 66, Nylon 6, polyester fiber, aramid fiber, and polyamide fiber; those formed from non-woven base fabrics; and those formed using a woven substrate of a sheet or film of a thermoplastic resin as the base fabric.

There are no particular restrictions on the method used for coating a composition of the present invention onto these air bags, and conventional methods can be employed. The quantity of the composition applied to the surface of an air bag (base fabric) in order to form the rubber coating layer is typically equivalent to a dry quantity within a range from 10 to 150 g/m$^2$, and preferably from 15 to 80 g/m$^2$, and most preferably from 20 to 60 g/m$^2$.

EXAMPLES

As follows is a description of specifics of the present invention using a series of examples, although the present invention is in no way restricted to the examples presented below. The units "parts" refer to "parts by mass", and viscosity values represent values measured at 25° C. Furthermore, the adhesive improvers (i) to (iii) used in the examples refer to compounds with the structures represented by the chemical formulas shown below.

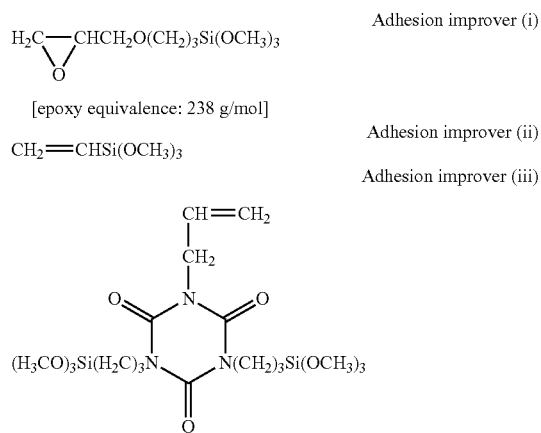

Example 1

A composition 1 was prepared by mixing uniformly together 40 parts of a dimethylpolysiloxane with a viscosity of 1,000 mPa·s and with both molecular chain terminals blocked with dimethylvinylsiloxy groups, 40 parts of a dimethylpolysiloxane with a viscosity of 5,000 mPa·s and with both molecular chain terminals blocked with dimethylvinylsiloxy groups, 20 parts of a copolymer of dimethylsiloxane and methylvinylsiloxane, in which the principal chain diorganosiloxane units comprise 5 mol % of vinylmethylsiloxane units and 95 mol % of dimethylsiloxane units, with a viscosity of 700 mPa·s, and with both molecular chain terminals blocked with trimethylsiloxy groups, 17 parts of a hydrophobic silica that had undergone hydrophobic surface treatment with trimethylsilyl groups, with a specific surface area of 120 m$^2$/g, 1.0 parts of a methylhydrogenpolysiloxane with a viscosity of 50 mPa·s and with both molecular chain terminals blocked with trimethylsiloxy groups (silicon atom-bonded hydrogen atom content=1.45% by mass), 2.2 parts of a copolymer of dimethylsiloxane and methylhydrogensiloxane, with a viscosity of 25 mPa·s and with silicon atom-bonded hydrogen atoms at both molecular chain terminals and at non-terminal positions within the molecular chain (silicon atom-bonded hydrogen atom content=0.54% by mass), 0.05 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 30 ppm, 1.5 parts of the adhesion improver (i), 0.5 parts of the adhesion improver (ii), 0.5 parts of octyl titanate, and 10 parts of a gelled silica (product name: Nipgel BY-001, manufactured by Tosoh Silica Corporation) with a specific surface area of 450 m$^2$/g and an average particle size of 14 μm.

In the composition 1, the number of mols of silicon atom-bonded hydrogen atoms within the composition for each 1 mol of silicon atom-bonded vinyl groups within the composition (hereafter referred to as "SiH/SiVi") was 3.9.

This composition 1 was cured by heating at 150° C. for 5 minutes, a sheet 1 was prepared in accordance with JIS K6249 and the general physical properties of the sheet (the hardness, tensile strength, shear elongation, and tear strength) were measured, and then the measurement methods described below were used to conduct a peel adhesive strength test, an inflation test, and a blocking resistance test. The results obtained are shown in Table 1.

<Measurement Methods>

1. Peel Adhesive Strength Test

The composition prepared above was sandwiched between 2 sheets of woven Nylon 66 (420 denier) used in air bag production, in sufficient quantity to form a layer with a dried thickness of 0.5 mm, and the composition was subsequently cured by applying a pressure of 490 kN/m$^2$ at 170° C. for a period of 1 minute, thereby forming a rubber coating layer. The resulting product, comprising the 2 sheets of woven Nylon 66 had bonded together by the rubber coating layer, was cut into strips of width 2.5 cm×length 20 cm, and a peel adhesive strength test was then conducted by pulling the two sheets of woven Nylon 66 apart at an angle of 180 degrees and at a speed of 50 mm/minute.

2. Inflation Test

The prepared composition was coated onto a woven air bag substrate using a coater, in a manner that enabled formation of a uniform coating with no unevenness, and with the quantity used of the composition kept to a minimum. Subsequently, the air bag was placed in an oven and heated at 170° C. for one minute to cure the coating, thus completing preparation of a woven air bag with a rubber coating layer. This air bag was inflated instantaneously by blowing in air at a pressure of 690 kN/m$^2$ for 3 seconds, and the air tightness through the wall thickness of the bag was observed. The inflation was evaluated as "good", represented by the grade "A", if no separation of the rubber coating layer was observed, or evaluated as "poor", represented by the grade "B", if separation of the rubber coating layer was detected.

3. Blocking Resistance Test

A blocking resistance test was conducted by evaluating the stickiness of the surface of the rubber coating layer. A rubber coating layer with a dried thickness of 0.2 mm was formed on one surface of a piece of fabric (the film-formed fabric), the fabric was cut into a specimen with a width of 100 mm and a length of 200 mm, and the rubber coating surface of this specimen was then adhered in an air tight manner to a glass plate. This glass plate with the adhered film-formed fabric was then stood vertically, the time taken for the film-formed fabric to fall naturally from the glass plate was measured, and this time was evaluated in accordance with the following evaluation criteria. Namely, if the time taken from the point of standing the glass plate vertically until the point where the film-formed fabric fell from the glass plate was less than 3 seconds, the blocking resistance was evaluated as "good", represented by the grade "A", a time of at least 3 seconds but less than 10 seconds was evaluated as "fair", represented by the grade "B", and a time of 10 seconds or longer was evaluated as "poor", represented by the grade "C".

Example 2

A composition 2 was prepared by mixing together 40 parts of a dimethylpolysiloxane with a viscosity of 1,000 mPa·s and with both molecular chain terminals blocked with dimethylvinylsiloxy groups, 40 parts of a dimethylpolysiloxane with a viscosity of 5,000 mPa·s and with both molecular chain terminals blocked with dimethylvinylsiloxy groups, 15 parts of a copolymer of dimethylsiloxane and methylvinylsiloxane, in which the principal chain diorganosiloxane units comprise 10 mol % of vinylmethylsiloxane units and 90 mol % of dimethylsiloxane units, with a viscosity of 500 mPa·s and with both molecular chain terminals blocked with trimethylsiloxy groups, 5 parts of an organopolysiloxane comprising 39.5 mol % of $(CH_3)_3SiO_{1/2}$ units, 6.5 mol % of $(CH_3)_2(CH_2=CH)SiO_{1/2}$ units, and 54 mol % of $SiO_2$ units, 22 parts of a hydrophobic silica that had undergone hydrophobic surface treatment with trimethylsilyl groups, with a specific surface area of 170 m²/g, 1.8 parts of a methylhydrogenpolysiloxane with a viscosity of 45 mPa·s and with both molecular chain terminals blocked with trimethylsiloxy groups (silicon atom-bonded hydrogen atom content=1.14% by mass), 5.3 parts of a copolymer of dimethylsiloxane and methylhydrogensiloxane, with a viscosity of 12 mPa·s and with silicon atom-bonded hydrogen atoms at both molecular chain terminals and at non-terminal positions within the molecular chain (silicon atom-bonded hydrogen atom content=0.54% by mass), 0.03 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 15 ppm, 1 part of the above adhesion improver (i), 0.5 parts of the adhesion improver (iii), 0.5 parts of octyl titanate, and 10 parts of a gelled silica (product name: Nipgel BY-001, manufactured by Tosoh Silica Corporation) with a specific surface area of 450 m²/g and an average particle size of 14 μm.

In this composition, SiH/SiVi was 3.4.

Testing and measurements of the general physical properties, the peel adhesive strength, the inflation characteristics, and the blocking resistance of this composition 2 were conducted in the same manner as the example 1. The results obtained are shown in Table 1.

Comparative Example 1

A composition C1 was prepared by mixing together 40 parts of a dimethylpolysiloxane with a viscosity of 1,000 mPa·s and with both molecular chain terminals blocked with dimethylvinylsiloxy groups, 40 parts of a dimethylpolysiloxane with a viscosity of 5,000 mPa·s and with both molecular chain terminals blocked with dimethylvinylsiloxy groups, 20 parts of a copolymer of dimethylsiloxane and methylvinylsiloxane, in which the principal chain diorganosiloxane units comprise 5 mol % of vinylmethylsiloxane units and 95 mol % of dimethylsiloxane units, with a viscosity of 700 mPa·s, and with both molecular chain terminals blocked with trimethylsiloxy groups, 17 parts of a hydrophobic silica that had undergone hydrophobic surface treatment with trimethylsilyl groups, with a specific surface area of 120 m²/g, 1.0 parts of a methylhydrogenpolysiloxane with a viscosity of 50 mPa·s and with both molecular chain terminals blocked with trimethylsiloxy groups (silicon atom-bonded hydrogen atom content=1.45% by mass), 2.2 parts of a copolymer of dimethylsiloxane and methylhydrogensiloxane, with a viscosity of 25 mPa·s and with silicon atom-bonded hydrogen atoms at both molecular chain terminals and at non-terminal positions within the molecular chain (silicon atom-bonded hydrogen atom content=0.54% by mass), 0.05 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 30 ppm, 1.5 parts of the adhesion improver (i), 0.5 parts of the adhesion improver (ii), 0.5 parts of octyl titanate, and 10 parts of a precipitated silica (product name: Nipsil LP, manufactured by Tosoh Silica Corporation) with a specific surface area of 200 m²/g and an average particle size of 8 μm.

In this composition, SiH/SiVi was 3.9.

Testing and measurements of the general physical properties, the peel adhesive strength, the inflation characteristics, and the blocking resistance of this composition C1 were conducted in the same manner as the example 1. The results obtained are shown in Table 1.

Comparative Example 2

A composition C2 was prepared by mixing together 100 parts of a dimethylpolysiloxane with a viscosity of 1,000 mPa·s and with both molecular chain terminals blocked with dimethylvinylsiloxy groups, 33 parts of a hydrophobic silica that had undergone hydrophobic surface treatment with trimethylsilyl groups, with a specific surface area of 170 m²/g, 2.7 parts of a methylhydrogenpolysiloxane with a viscosity of 45 mPa·s and with both molecular chain terminals blocked with trimethylsiloxy groups (silicon atom-bonded hydrogen atom content=1.14% by mass), 8.3 parts of a copolymer of dimethylsiloxane and methylhydrogensiloxane, with a viscosity of 12 mPa·s and with silicon atom-bonded hydrogen atoms at both molecular chain terminals and at non-terminal positions within the molecular chain (silicon atom-bonded hydrogen atom content=0.54% by mass), 0.06 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 15 ppm, 1.5 parts of the adhesion improver (i), 0.5 parts of the adhesion improver (ii), and 0.5 parts of octyl titanate.

In this composition, SiH/SiVi was 3.3.

Testing and measurements of the general physical properties, the peel adhesive strength, the inflation characteristics, and the blocking resistance of this composition C2 were conducted in the same manner as the example 1. The results obtained are shown in Table 1.

TABLE 1

|  | Example | | Comparative example | |
|---|---|---|---|---|
|  | 1 | 2 | 1 | 2 |
| Hardness (durometer A) | 35 | 45 | 34 | 44 |
| Tensile strength (MPa) | 7.0 | 6.5 | 7.0 | 4.5 |
| Shear elongation (%) | 400 | 400 | 400 | 250 |
| Tear strength (kN/m) | 20 | 20 | 20 | 10 |
| Peel adhesive strength (N/cm) | 40 | 40 | 40 | 20 |
| Inflation test | A | A | A | B |
| Blocking resistance | A | A | C | C |

<Evaluation>

As is evident from Table 1, in the examples 1 and 2, which satisfy the requirements of the first aspect of the present invention, both the obtained cured product (the rubber coating layer) and the air bag exhibited excellent results for all of the properties measured. In contrast, in the comparative examples 1 and 2, in which either the gelled silica was not added, or the requirements of the first aspect were not satisfied, the cured product and the air bag exhibited inferior results for at least one of the tensile strength, the shear elongation, the tear strength, the peel adhesive strength and the blocking resistance, and/or the inflation test result was unsatisfactory.

What is claimed is:

1. A liquid silicone rubber coating agent composition, comprising:
   (A) 100 parts by mass of an organopolysiloxane containing at least two alkenyl groups bonded to silicon atoms within each molecule,
   (B) an organohydrogenpolysiloxane containing at least two hydrogen atoms bonded to silicon atoms within each molecule, in sufficient quantity to provide from 1 to 7 mols of hydrogen atoms bonded to silicon atoms within said composition for each 1 mol of alkenyl groups bonded to silicon atoms within said composition,
   (C) an effective quantity of an addition reaction catalyst,
   (D) a combination of 1 to 50 parts by mass of a gelled silica with a BET specific surface area within a range from 400 to 500 m²/g and an average particle size within a range from 10 to 20 μm, and a silica filler other than the gelled silica, and
   (E) 0.1 to 10 parts by mass of an adhesion improver.

2. The composition according to claim 1, which comprises no organic solvent.

3. An air bag having a rubber coating layer comprising a cured product of the composition stated in claim 1.

4. The air bag according to claim 3, wherein a bag portion is woven.

5. The composition according to claim 1, wherein said component (A) is represented by an average composition formula (1)

wherein
R¹ represents an unsubstituted or substituted monovalent hydrocarbon group that contains no aliphatic unsaturated bonds,
R² represents an alkenyl group,
a represents a number from 1.7 to 2.1,
b represents a number from 0.00001 to 0.1, and
a+b represents a number within a range from 1.8 to 2.2;
said component (B) is an organohydrogen poly siloxane represented by an average composition formula (2)

wherein
R³ represents an unsubstituted or substituted monovalent hydrocarbon group,
c represents a number from 0.7 to 2.1,
d represents a number from 0.001 to 1.0,
and c+d represents a number within a range from 0.8 to 3.0;
said component (C) is at least one selected from the group consisting of platinum, palladium, rhodium, chloroplatinic acid, a coordination compound of chloroplatinic acid with an olefin, a coordination compound of chloroplatinic acid with vinylsiloxane, a coordination compound of chloroplatinic acid with an acetylene compound, tetrakis (triphenylphosphine) palladium, and chlorotris(triphenylphosphine)rhodium; and
said component (E) is at least one selected from the group consisting of:
at least one selected from the group consisting of an organosilane, an organosiloxane oligomer, an (alkoxy)silyl modified product of triallyl isocyanurate, and a siloxane derivative thereof, all of which comprise two or more functional groups selected from the group consisting of an alkenyl group, an epoxy group, a (meth)acryloxy group, an isocyanate group and a silicon atom-bonded hydrogen atom;
at least one non-silicon based organic compound selected from the group consisting of an allyl ester of acrylic acid, an allyl ester of methacrylic acid, an allyl ester of vinylacetic acid, allyl benzoate, diallyl phthalate, tetraallyl pyromellitate, allyl acetate, allyl propionate, allyl butyrate, allyl valerate and allyl laurate;
at least one epoxy ring-opening catalyst selected from the group consisting of an organometal chelate, an amine-based epoxy ring opening catalyst, an amide-based epoxy ring opening catalyst, an imidazole-based epoxy ring opening catalyst, an acid anhydride-based epoxy ring opening catalyst; and
at least one organotitanium compound selected from the group consisting of tetrabutoxytitanium, tetrakis(2-ethylhexyloxy)titanium, tetrastearyloxytitanium, titanium stearate, tetraoctyloxytitanium, titanium isopropoxyoctylene glycolate, triethanolamine titanate, titanium acetylacetonate, titanium ethyl acetonate, titanium lactonate, an oligomer generated as a condensation reaction product of said organotitanium compound and a polymer generated as a condensation reaction product of said organotitanium compound.

6. The composition according to claim 5, wherein
a quantity of said component (A) is 100 parts by mass,
a quantity of said component (B) is sufficient to provide from 2 to 6 mols of hydrogen atoms bonded to silicon atoms within said composition for each 1 mol of alkenyl groups bonded to silicon atoms within said composition,
a quantity of said component (C), calculated as the mass of the platinum-group metal relative to the combined mass of said component (A) and said component (B), is within a range from 0.1 to 1,000 ppm,
a quantity of said gelled silica contained in said component (D) is within a range from 1 to 10 parts by mass, and
a quantity of said component (E) is within a range from 0.5 to 5 parts by mass.

7. The composition according to claim 1, wherein a quantity of said gelled silica contained in said component (D) is within a range from 1 to 10 parts by mass.

8. The composition according to claim 1, wherein a quantity of said silica filler other than said gelled silica contained in said component (D) is within a range from 17 to 22 parts by mass.

9. The composition according to claim 1, wherein said silica filler other than said gelled silica is a hydrophobic silica.

10. The composition according to claim 1, wherein said gelled silica has not undergone surface treatment.

11. The composition according to claim 1, wherein a quantity of said component (D) is within a range from 27 to 32 parts by mass.

* * * * *